United States Patent
Dymond et al.

(10) Patent No.: US 11,038,385 B2
(45) Date of Patent: Jun. 15, 2021

(54) STATOR ASSEMBLY

(71) Applicant: Dyson Technology Limited, Wiltshire (GB)

(72) Inventors: Nigel Youatt Dymond, Swindon (GB); Andrew Simeon Barnes, Bath (GB); Andrew Charlton Clothier, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 595 days.

(21) Appl. No.: 15/376,422

(22) Filed: Dec. 12, 2016

(65) Prior Publication Data
US 2017/0170693 A1 Jun. 15, 2017

(30) Foreign Application Priority Data
Dec. 11, 2015 (GB) .................................... 1521891

(51) Int. Cl.
*H02K 1/14* (2006.01)
*H02K 15/02* (2006.01)
(Continued)

(52) U.S. Cl.
CPC ............. *H02K 1/141* (2013.01); *H02K 1/143* (2013.01); *H02K 1/185* (2013.01); *H02K 1/2733* (2013.01);
(Continued)

(58) Field of Classification Search
CPC ...... H02K 15/028; H02K 1/141; H02K 1/143; H02K 1/27; H02K 21/18; H02K 21/185;
(Continued)

(56) References Cited

U.S. PATENT DOCUMENTS 3,495,111 A   2/1970  Haydon
3,593,049 A   7/1971  Dittrich et al.
(Continued)

FOREIGN PATENT DOCUMENTS

CN   101316066   12/2008
CN   206302219    7/2017
(Continued)

OTHER PUBLICATIONS

Search Report dated May 20, 2016, directed to GB Application No. 1521891.0; 1 page.
(Continued)

*Primary Examiner* — Emily P Pham
(74) *Attorney, Agent, or Firm* — Morrison & Foerster LLP

(57) ABSTRACT

A four-pole stator assembly including a bobbin assembly; and two c-shaped stator cores, each c-shaped stator core comprising a back and first and second pole arms extending from the back. The bobbin assembly includes first and second bobbin portions, each bobbin portion comprising two hollow bobbin arms, each bobbin arm defining a slot for receiving a pole arm, and a winding wound around each bobbin arm. The c-shaped stator cores are arranged such that each c-shaped stator core bridges across both bobbin portions with one of the first and second pole arms extending through a slot in the first bobbin portion, and the other of the first and second pole arms extending through a slot in the second bobbin portion, the pole arms being fixed in the slots by adhesive.

21 Claims, 3 Drawing Sheets

(51) Int. Cl.
  *H02K 3/52* (2006.01)
  *H02K 37/16* (2006.01)
  *H02K 21/18* (2006.01)
  *H02K 1/18* (2006.01)
  *H02K 1/27* (2006.01)
  *H02K 3/32* (2006.01)

(52) U.S. Cl.
  CPC ............. *H02K 3/325* (2013.01); *H02K 3/524* (2013.01); *H02K 15/028* (2013.01); *H02K 21/18* (2013.01); *H02K 21/185* (2013.01); *H02K 37/16* (2013.01)

(58) Field of Classification Search
  CPC .......... H02K 37/16; H02K 3/18; H02K 3/524; H02K 7/14
  See application file for complete search history.

(56) References Cited

U.S. PATENT DOCUMENTS

| | | | |
|---|---|---|---|
| 4,166,265 | A | 8/1979 | Reynolds et al. |
| 4,259,603 | A | 3/1981 | Uchiyama et al. |
| 4,720,646 | A | 1/1988 | Torimoto |
| 5,073,735 | A | 12/1991 | Takagi |
| 5,275,141 | A | 1/1994 | Tsunoda et al. |
| 5,604,971 | A | 2/1997 | Steiner |
| 5,627,424 | A | 5/1997 | Steiner |
| 5,708,406 | A | 1/1998 | Tsunoda et al. |
| 5,943,760 | A | 8/1999 | Barzideh et al. |
| RE36,545 | E | 2/2000 | Steiner |
| 6,356,046 | B1 | 3/2002 | Koumura et al. |
| 2003/0098660 | A1 | 5/2003 | Erdman et al. |
| 2004/0155549 | A1* | 8/2004 | Marioni ............... H02K 1/148 310/194 |
| 2007/0052318 | A1* | 3/2007 | Marioni ............... H02K 1/143 310/216.037 |
| 2008/0303374 | A1 | 12/2008 | Yokoyama et al. |
| 2009/0009014 | A1* | 1/2009 | Binder ................. H02K 3/522 310/71 |
| 2010/0225197 | A1 | 9/2010 | Fulford et al. |
| 2011/0043067 | A1 | 2/2011 | Li et al. |
| 2011/0162225 | A1 | 7/2011 | Obermann et al. |
| 2012/0181793 | A1 | 7/2012 | Hein |
| 2013/0181556 | A1 | 7/2013 | Li et al. |
| 2013/0249330 | A1* | 9/2013 | King .................... H02K 1/141 310/43 |
| 2014/0132106 | A1* | 5/2014 | Horst ................... H02K 21/185 310/216.001 |
| 2014/0132110 | A1 | 5/2014 | Burton et al. |
| 2014/0167534 | A1 | 6/2014 | Hata |
| 2014/0246942 | A1* | 9/2014 | Greetham ............. H02K 3/18 310/208 |
| 2014/0328670 | A1 | 11/2014 | Lamb |
| 2014/0328684 | A1 | 11/2014 | King et al. |
| 2015/0137639 | A1 | 5/2015 | Gomyo et al. |
| 2017/0033637 | A1 | 2/2017 | Matsuoka |
| 2017/0093262 | A1* | 3/2017 | Li ......................... H02K 1/278 |
| 2017/0170693 | A1 | 6/2017 | Dymond et al. |
| 2017/0170697 | A1 | 6/2017 | Locke et al. |

FOREIGN PATENT DOCUMENTS

| | | |
|---|---|---|
| DE | 1117 213 | 11/1961 |
| EP | 1 267 470 | 12/2002 |
| EP | 1 437 817 | 7/2004 |
| FR | 2 667 995 | 4/1992 |
| GB | 2 248 728 | 4/1992 |
| GB | 2 362 268 | 11/2001 |
| GB | 2495545 | 4/2013 |
| JP | 54-48306 | 4/1974 |
| JP | 60-26446 | 2/1985 |
| JP | 60-26447 | 2/1985 |
| JP | 60-144135 | 7/1985 |
| JP | 60-134401 | 9/1985 |
| JP | 3-203547 | 9/1991 |
| JP | 9-97711 | 4/1997 |
| JP | 2001-327148 | 11/2001 |
| JP | 2001-327151 | 11/2001 |
| JP | 2006-191718 A | 7/2006 |
| JP | 2007-295771 | 11/2007 |
| JP | 2010-207081 A | 9/2010 |
| JP | 2013-201893 | 10/2013 |
| JP | 2015-95947 | 5/2015 |
| JP | 2015-142497 A | 8/2015 |
| KR | 10-2014-0135778 A | 11/2014 |
| KR | 10-2015-0134391 A | 12/2015 |
| RU | 109349 U1 | 10/2011 |
| RU | 2506024 C2 | 2/2014 |
| RU | 2540415 C2 | 2/2015 |
| WO | 2013/140129 A1 | 9/2013 |
| WO | WO-2015/159250 | 10/2015 |

OTHER PUBLICATIONS

International Search Report and Written Opinion dated Mar. 15, 2017, directed to International Application No. PCT/GB2016/053703; 12 pages.

Locke et al., U.S. Office Action dated Oct. 1, 2018, directed to U.S. Appl. No. 15/376,351; 7 pages.

Locke et al., U.S. Office Action dated May 15, 2019, directed to U.S. Appl. No. 15/376,351; 8 pages.

Locke et al., U.S. Office Action dated May 15, 2020, directed to U.S. Appl. No. 15/376,351; 10 pages.

Notification of Reason for Refusal dated Apr. 11, 2019, directed to KR Application No. 10-2018-701210; 8 pages.

Locke et al., U.S. Office Action dated Mar. 15, 2021, directed to U.S. Appl. No. 15/376,351; 10 pages.

\* cited by examiner

STATOR ASSEMBLY

REFERENCE TO RELATED APPLICATIONS

This application claims the priority of United Kingdom Application No. 1521891.0, filed Dec. 11, 2015, the entire contents of which are incorporated herein by reference.

FIELD OF THE INVENTION

The present invention relates to a stator assembly for an electric motor.

BACKGROUND OF THE INVENTION

Electric motors typically comprise a rotor assembly and a stator assembly. The stator assembly in a permanent magnet brushless motor comprises a stator core and a winding. The winding is provided around part of the stator core, and is usually provided on a bobbin which is fixed to the stator core. Winding the winding on the bobbin may be done before or after the bobbin has been attached to the stator core. Winding the winding on the bobbin prior to the bobbin being attached to the stator core allows for an easy winding operation. However, it limits the shape of the stator core. More often, the bobbin will be overmolded to the stator core first, and then the winding is wound round it. However, this can lead to a very difficult winding operation. Difficult winding operations may require specialist machinery and can greatly increase the cost of manufacturing a motor.

Typically, the stator core is fixed to a frame of the motor such that the positioning of the stator core relative to other components of the motor, such as the rotor assembly can be carefully controlled to a very high tolerance. However, using the stator cores for positioning in this way can make them expensive to make in order to achieve the high tolerance, and can also make them big and bulky. This increases the cost and weight of the overall motor.

Accordingly, an electric motor is required that has an improved stator assembly which can go some way to alleviate the problems discussed above.

SUMMARY OF THE INVENTION

Aspects of this invention provide a four-pole stator assembly comprising: a bobbin assembly; and two c-shaped stator cores, each c-shaped stator core comprising a back, and first and second pole arms extending from the back. The bobbin assembly comprises first and second bobbin portions, each bobbin portion comprising two hollow bobbin arms, each bobbin arm defining a slot for receiving a pole arm, and a winding wound around each bobbin arm. The c-shaped stator cores are arranged such that each c-shaped stator core bridges across both bobbin portions with one of the first and second pole arms extending through a slot in the first bobbin portion, and the other of the first and second pole arms extending through a slot in the second bobbin portion, the pole arms being fixed in the slots by adhesive.

As a result the windings can be wound around each of the bobbin portions separately using an easy winding procedure, and then when the stator assembly is assembled, the bobbin portions are securely held together by the c-shaped stator cores which bridge across both portions. This allows for a quicker and more simple manufacturing process which can reduce the cost of manufacturing the stator assembly, and therefore also the motor.

Each of the first and second bobbin portions may comprise a semi-cylindrical recess. The semi-cylindrical recess in each bobbin portion may form part of a cylindrical bore through the bobbin assembly. When the two bobbin portions are brought together during assembly, the two semi-cylindrical recesses form the cylindrical bore through the bobbin assembly. This cylindrical bore is able to receive a magnet from a rotor assembly when the stator assembly is assembled into an electric motor, and allows or a high level of control over the relative positioning of the magnet and stator cores.

The semi-cylindrical recess may comprise two pole face windows, each pole face window representing an interior termination of each of the slots through the respective bobbin portion. Accordingly, the window allows for good magnetic interaction between the c-shaped stator core and a magnet positioned within the cylindrical bore, due to the close proximity the pole face window allows.

Each pole arm of each c-shaped stator core may comprise a pole face at an opposite end of the pole arm to the back. Each pole arm may comprise a groove for containing adhesive positioned proximate to the pole face. This allows for a strong bond between the bobbin assembly and the c-shaped stator core close to the pole face to reduce any flexing of the pole arms.

Each pole face may be located at a pole face window so as to form part of the wall of the semi-cylindrical recess. Accordingly, the pole faces can be positioned as close to a magnet located inside the cylindrical bore as possible and may allow for a better magnetic interaction between the stator cores and magnet.

Each bobbin arm may comprise an outer flange. The flange acts to keep the windings in place on the bobbin arms and reduces the risk of the windings becoming dislodged.

The bobbin assembly may comprise one or more fixing recesses. Each bobbin portion of the bobbin assembly may comprise a fixing recess. Accordingly, the bobbin assembly can easily be fixed to a frame or other component when incorporated into a motor. The entire stator assembly may be fixed to the motor by way of the one or more fixing recesses in the bobbin assembly.

In a further aspect, this invention provides electric motor comprising a stator assembly as described in any of the preceding statements, a rotor assembly and a frame.

As a result the manufacturing and assembly of the motor may be made easier due to the benefits of the stator assembly described above. In turn the cost of the motor and the associated manufacturing costs may be minimised.

The rotor assembly may comprise a permanent magnet fixed to a rotatable shaft, and the rotor assembly may be positioned such that the permanent magnet is located between the c-shaped stator cores. The permanent magnet may be a four pole magnet such that each pole interacts with each of the pole faces in the stator assembly which comprises two c-shaped stator cores.

The bobbin assembly may be fixed to the frame, the frame comprising one or more lugs that fit into one or more fixing recesses in the bobbin assembly, and the one or more lugs may be fixed in the one or more fixing recesses by adhesive.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
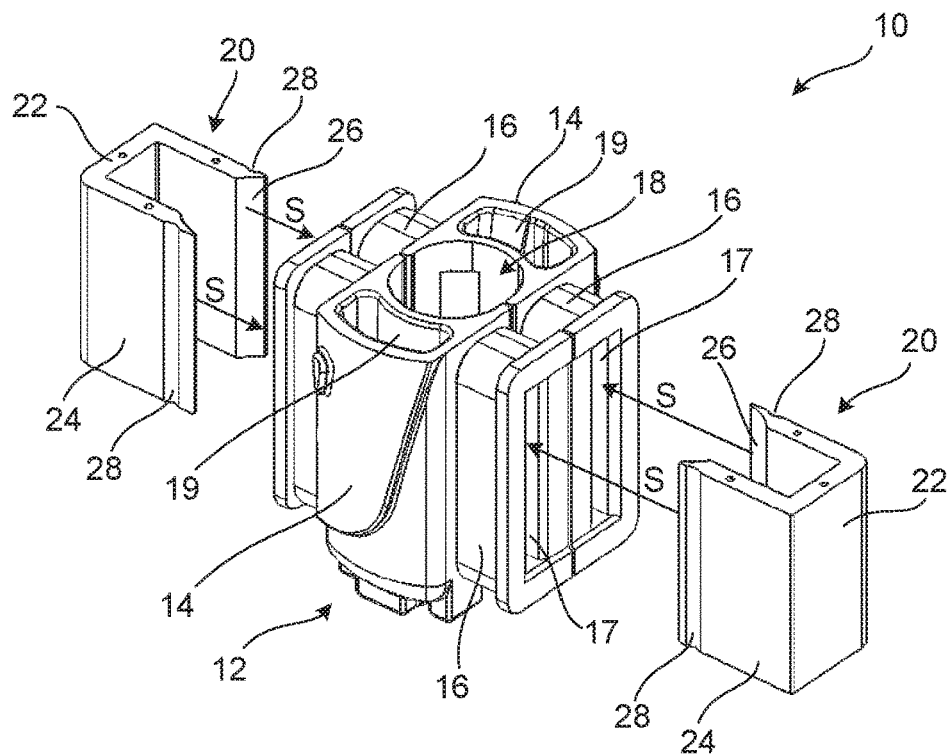
FIG. 1 is a stator assembly.

FIG. 1 shows a stator assembly 10. The stator assembly 10 comprises two c-shaped stator cores 20 and a bobbin assembly 12. Each c-shaped stator core 20 (also referred to as a c-core) comprises a back 22 and two pole arms 24 extending from the back 22. At the end of each pole arm 24 is a pole face 26. On the outer side of each pole arm 24 behind the pole face 26 is a groove 28 that runs along the axial length of the pole arm 24. The groove 28 provides a volume into which adhesive can collect, this area ensures that there is a solid adhesive bond between the c-core 20 and the bobbin assembly 12. It will be understood that by having the pole faces 26 at the end of the pole arms 24, there is the possibility that the pole arms 24 could flex under the fluctuating magnetic forces when a magnet rotates close to the c-core 20. Any movement of the pole faces relative to the magnet may have a detrimental effect on the performance of a motor. Therefore, by positioning the groove 28 proximate to the pole face 26, any movement of the pole face 26 is kept to a minimum. By "proximate" it is meant that the groove 28 and the pole face 26 are positioned close enough to one another such that the adhesive bond minimises any movement of the pole face 26 when a rotor magnet is spinning close to the c-core 20.

Alternatively, the pole arms 24 may not comprise any grooves. In this instance, adhesive can be provided along a substantial portion of the outer side of each pole arm such that a large bonding area is provided between the pole arm and the bobbin assembly. This results in a strong adhesive bond which is equally effective in minimising any movement of the pole face 26 when a rotor magnet is spinning.

On each c-core 20, the pole face 26 at the end one pole arm 24 is different to the pole face on the end of the other pole arm for that c-core 20. The reason for the asymmetry between the pole faces 26 is to increase saliency. Increased saliency encourages a rotor to park in a particular position relative to the stator cores when not rotating such that it is easy to restart the motor in a particular direction. If both pole faces 26 on a c-core 20 were the same then it would be difficult to encourage the rotor to rotate in a desired direction when the motor is started.

Figure 2:
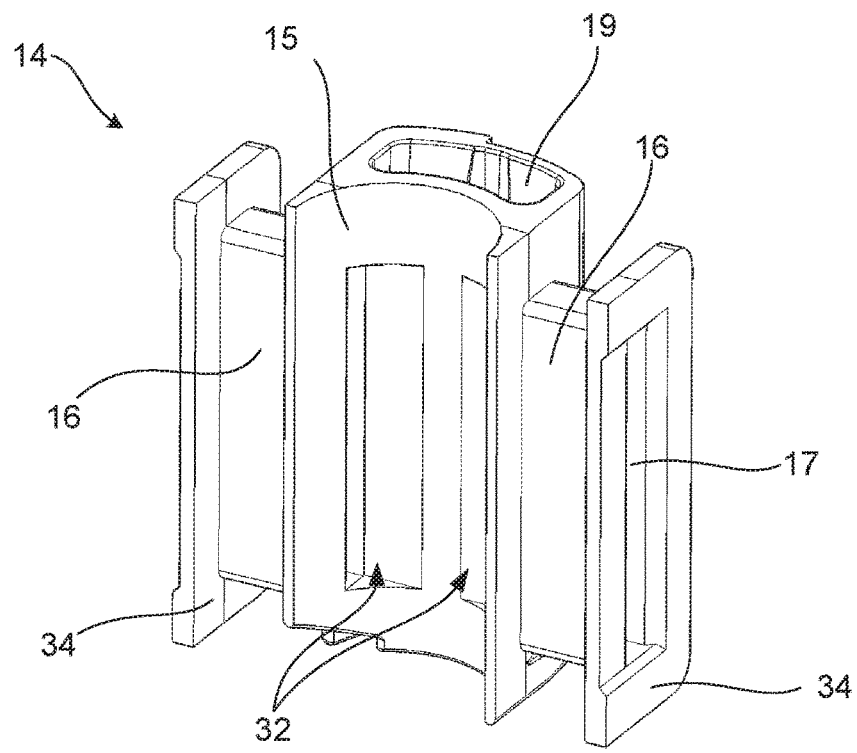
FIG. 2 is a bobbin portion.

The bobbin assembly 12 comprises two bobbin portions 14. A single bobbin portion 14 is shown in more detail in FIG. 2. Each bobbin portion 14 comprises two hollow bobbin arms 16 extending outwards, each having a flange 34 at the end. The bobbin arms 16 define slots 17 that are able to receive pole arms 24 from the c-cores 20. Windings (not shown) for inducing a magnetic field in the c-cores 20 can be wound around the bobbin arms 16, and the flanges 34 act to keep the windings in place on the bobbin arms 16. The slots 17 through the bobbin arms 16 allow the pole arms 24 of the c-cores 20 to slot into the bobbin assembly 12 such that a winding is positioned around each pole arm 24. FIG. 1 shows how the stator assembly 10 is assembled by sliding the c-cores 20 into the bobbin assembly 12, as represented by the arrows S, once both bobbin portions have been brought together into abutment with one another. The c-cores 20 are arranged such that each c-core 20 bridges across both bobbin portions 14, with one pole arm 24 extending through a slot in the first bobbin portion, and the other pole arm 24 extending through a slot in the second bobbin portion.

By bridging the c-cores 20 across the two bobbin portions 14, the two bobbin portions 14 are securely held together by the c-shaped stator cores 20. One reason for providing two separate bobbin portions 14 is that it is easier to wind the windings around the bobbin arms 16 when the bobbin portions are separated. As can be seen from the figures, the flanges 34 abut each other when the two bobbin portions 14 are positioned together such that there is no gap between them. It would be difficult and expensive to wind the windings around the bobbin arms 16 without the bobbin assembly 12 being provided in two separable portions, as it would be necessary to thread the winding wire through the gap between the bobbin arms 16.

Each bobbin portion 14 comprises a semi-cylindrical recess 15, and when the two bobbin portions 14 are brought together, each of the semi-cylindrical recesses 15 form part of a cylindrical bore 18 through the centre of the bobbin assembly 12. The semi-cylindrical recess 15 on each bobbin portion 14 has two windows 32 that represent the termination of the slots 17 of each bobbin arm 16 inside the bobbin assembly 12. When the stator assembly 10 is fully assembled, the pole faces 26 of the c-cores 20 will be positioned at the windows 32 and will form part of the wall of the bore 18.

The bobbin assembly 12 further comprises fixing recesses 19 which enable the stator assembly 10 to be fixed in a motor. Each bobbin portion 14 comprises one fixing recess 19, and further explanation of how the stator assembly 10 can be fixed in a motor will be described later.

Figure 3:
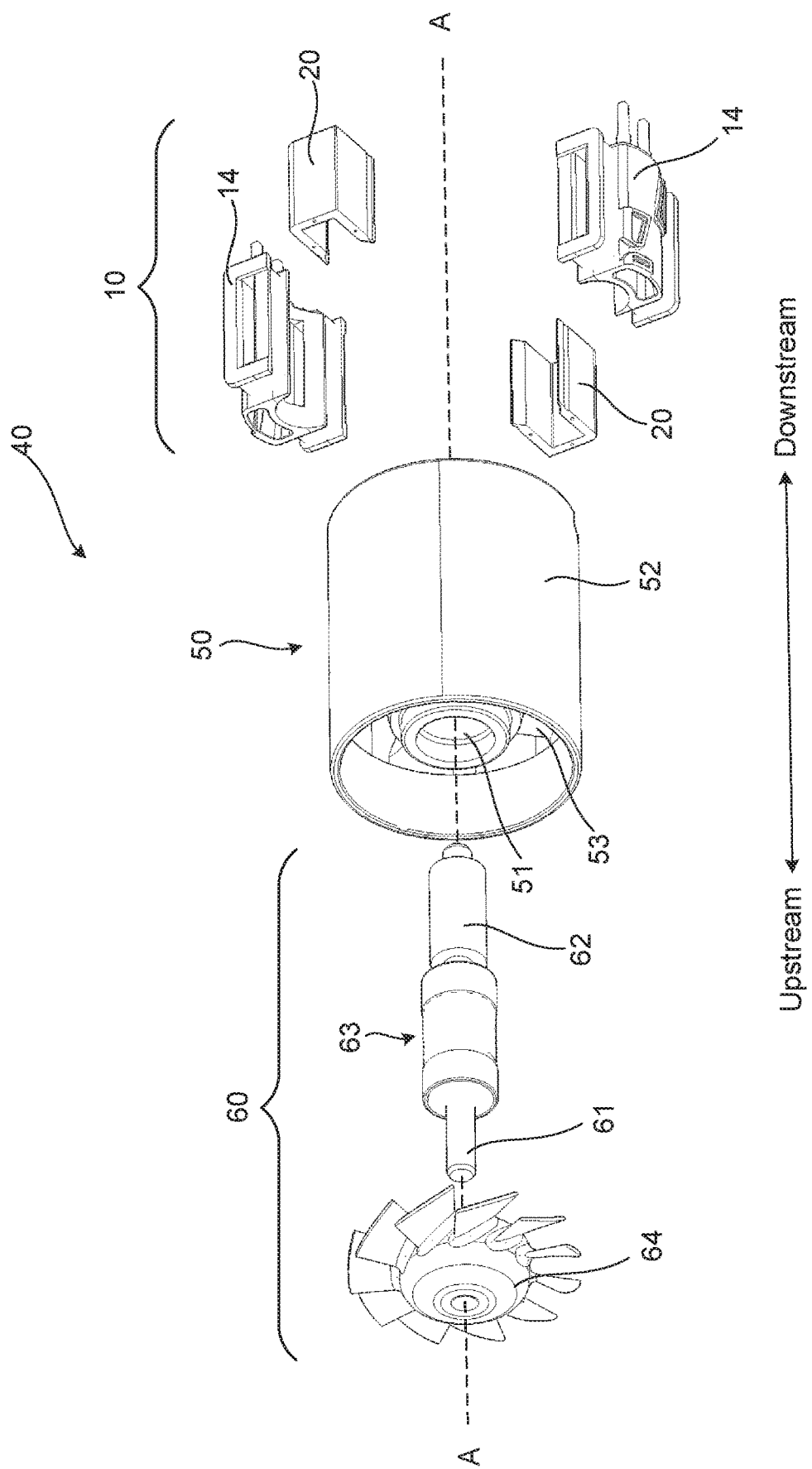
FIG. 3 is an exploded perspective view of an electric motor comprising the stator assembly of FIG. 1.

FIG. 3 shows an exploded perspective view of an electric motor 40. The electric motor 40 comprises the stator assembly 10 previously described, and also comprises a frame 50 and a rotor assembly 60. The frame 50 comprises an inner wall 51 and an outer wall 52. The outer wall 52 surrounds the inner wall 51 such that an annular channel 54 is defined between them. A number of diffuser vanes 53 extend between the inner wall 51 and the outer wall 52 through the annular channel 54. The rotor assembly 60 comprises a shaft 61, a magnet 62, a bearing assembly 63 and an impeller 64. When assembled, the magnet 62, bearing assembly 63 and impeller 64 are all fixed directly to the shaft 61 by one or a combination of an interference fit and adhesive. The magnet 62 is a bonded permanent magnet of the sort typically used in permanent magnet brushless motors, and in the example shown the magnet 62 is a four-pole permanent magnet.

The rotor assembly 60 is supported in the frame 50 by the inner wall 51. The bearing assembly 63 is fixed inside the bore defined by the inner wall 51 such that the inner wall 51 of the frame 50 acts as a protective sleeve around the bearing assembly 63. This eliminates the need for the bearing assembly 63 to have a separate protective sleeve, and helps to reduce the size and weight of the motor 40. When the motor 40 is fully assembled, the magnet 62 extends beyond the inner wall 51 of the frame 50 such that it is positioned wholly within the stator assembly 10 between the c-cores 20.

For the sake of clarity, the term "axial" is intended to mean in the direction of an axis running along a rotational axis of the motor 40 as depicted by axis A-A in FIG. 3. In addition, the directional terms "upstream" and "downstream" referred to herein refer to the direction of airflow through the motor when in use and are further clarified by the double headed arrow in FIG. 3.

Figure 4:
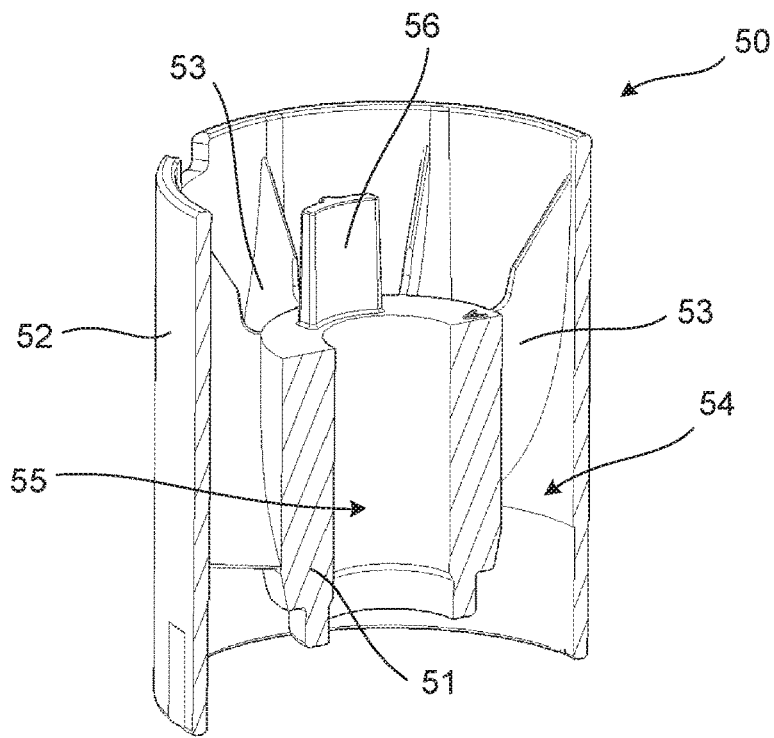
FIG. 4 is a cross section through the frame of the electric motor of FIG. 3.

A cross section through the frame 50 is shown in FIG. 4. The inner wall 51 is cylindrical and defines a bore 55. The inner wall 51 supports the rotor assembly 60 within the bore 55 when the motor 40 is assembled. In addition, the inner wall 51 has a lug 56 that extends from one end of the inner wall 51 in an axial direction. In particular, the lug 56 extends axially in a downstream direction. The lug 56 provides a mounting point onto which the stator assembly 10 can be easily mounted in order to fix it to the frame 50. FIG. 4 shows a single lug 56, however multiple lugs 56 may be provided depending on the number of fixing recesses 19 provided on the stator assembly 10 and other requirements of the motor. The lugs 56 are positioned such that they are receivable inside the fixing recesses 19 of the bobbin assembly 12. The lugs 56 and fixing recesses 19 may be appropriately sized such that the lugs fit snugly inside the recesses so as to form an interference fit. Alternatively, the recesses 19 may be large enough so as to be able to accommodate the lugs 56 as well as a volume of adhesive. In this instance, during assembly of the motor 1, adhesive may be applied inside the recesses, or to the outside of the lugs, or both, prior to bringing the stator assembly 10 and the frame 50 together.

The recess 19 in the bobbin assembly 12 allows the stator assembly 10 to be fixed to the frame 50 of the motor 40 at the bobbin assembly 12 rather than using the stator cores 20 themselves. Accordingly the c-cores 20 do not need to be made as large. This helps to reduce the cost and weight of the stator assembly, and therefore the whole motor as well. In addition, as the only function of the c-cores 20 is to provide a magnetic pathway through which the magnetic flux can pass (i.e. there are no structural or fixing considerations required for the c-cores 20), a greater amount of design freedom is afforded to the c-cores in order that their shape and size can be optimised to reduce magnetic saturation.

Figure 5:
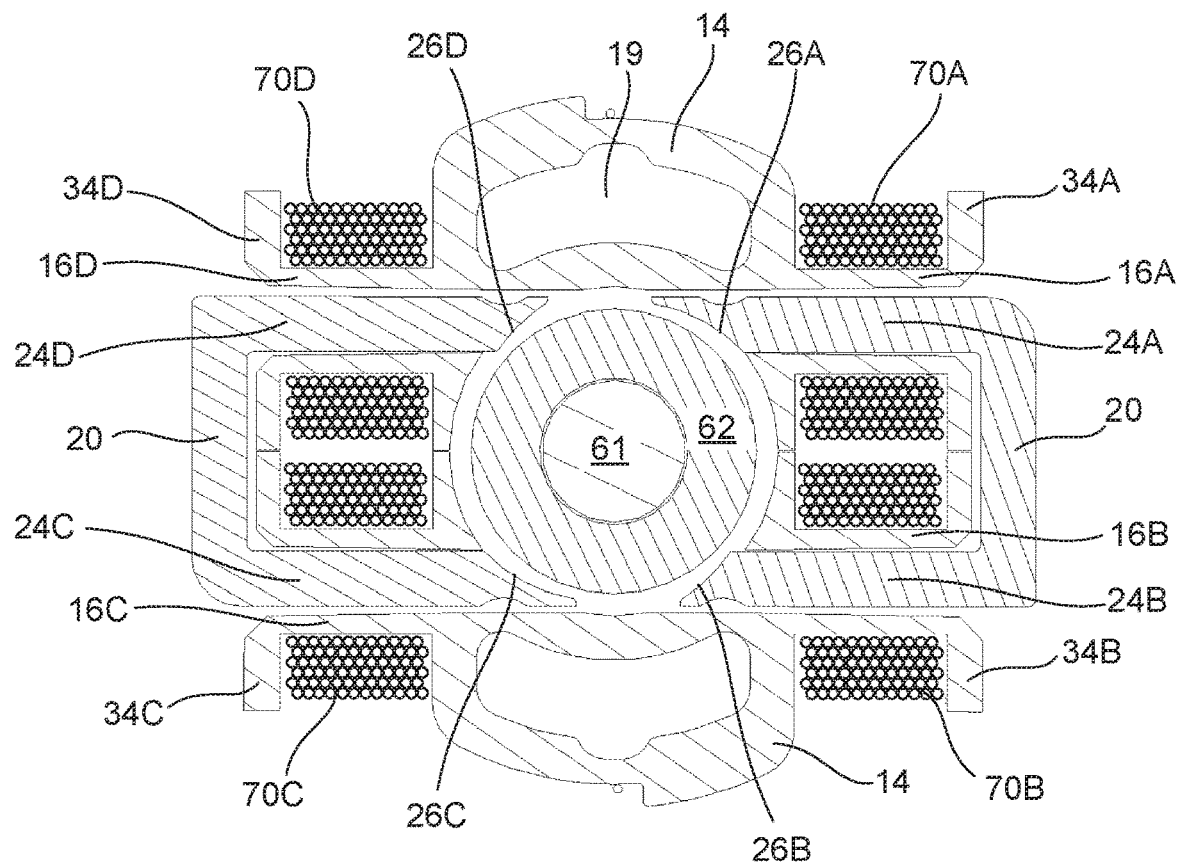
FIG. 5 is a cross section through the stator assembly and rotor assembly of the electric motor of FIG. 3.

FIG. 5 shows a cross section through the assembled stator assembly 10 and shaft 61 and magnet 62 of rotor assembly 60. The central part of each bobbin portion 14 comprises the fixing recess 19. One of the bobbin portions 14 comprises bobbin arms 16A and 16D, and the other of the bobbin portions 14 comprises bobbin arms 16B and 16C. Windings 70A-D are wound around each of the bobbin arms 16A-D and held in place by the flanges 34A-D respectively. Two c-cores 20 are provided, a first c-core comprises pole arms 24A and 24B, and the other of the c-cores comprises pole arms 24C and 24D. Pole faces 26A-D are provided at the end of each of the pole arms 24A-D respectively. The c-cores 20 are positioned such that the pole arms 24A-D extend through the slots in the bobbin arms 16A-D, and in such a way that each c-core 20 bridges across both bobbin portions 14. For instance, as shown in FIG. 5, pole arm 24A of one of the c-cores extends through a slot in bobbin arm 16A of one of the bobbin portions, whilst pole arm 24B of the same c-core extends through a slot in bobbin arm 16B in a different bobbin portion. The same applies for the other of the two c-cores: pole arm 24C extends through a slot in bobbin arm 16C in one of the bobbin portion, whereas pole arm 24D extends through a slot in bobbin arm 16D in the other bobbin portion.

Accordingly, with the c-cores arranged in this way, windings 70A-D are positioned around each of the pole arms 24A-D respectively, and when current is passed through the windings 70A-D a magnetic field is induced through the c-cores 20 and at the pole faces 26A-D.

The shaft 61 and magnet 62 of the rotor assembly 60 are positioned inside the stator assembly 10 between the c-cores 20 and within the cylindrical bore that is formed by the two semi-cylindrical recesses of the bobbin portions 14. The magnet 62 has four poles (not shown) which magnetically interact with the four pole faces 26A-D during operation of the motor 40.

Whilst particular embodiments have thus far been described, it will be understood that various modifications may be made without departing from the scope of the invention as defined by the claims.

The invention claimed is:

1. A four-pole stator assembly comprising:
a bobbin assembly; and
two c-shaped stator cores, each of the two c-shaped stator cores comprising a back and first and second pole arms extending from the back;
wherein the bobbin assembly comprises first and second bobbin portions, each of the first and second bobbin portions comprising two hollow bobbin arms, each of the two hollow bobbin arms defining a slot for receiving a pole arm, and a winding wound around each of the two hollow bobbin arms, and wherein the two c-shaped stator cores are arranged such that each of the two c-shaped stator cores bridges across both the first and second bobbin portions with one of the first and second pole arms extending through a slot in the first bobbin portion, and the other of the first and second pole arms extending through a slot in the second bobbin portion, the pole arms being fixed in the slots by adhesive.

2. The four-pole stator assembly of claim 1, wherein each of the first and second bobbin portions comprises a semi-cylindrical recess.

3. The four-pole stator assembly of claim 2, wherein the semi-cylindrical recess comprises two pole face windows, each of the two pole face windows representing an interior termination of each of the slots through the respective bobbin portion.

4. The four-pole stator assembly of claim 2, wherein the semi-cylindrical recess in each of the first and second bobbin portions forms part of a cylindrical bore through the bobbin assembly.

5. The four-pole stator assembly of claim 1, wherein each pole arm of each of the two c-shaped stator cores comprises a pole face at an opposite end of the pole arm to the back.

6. The four-pole stator assembly of claim 5, wherein each pole arm comprises a groove for containing adhesive positioned proximate to the pole face.

7. The four-pole stator assembly of claim 5, wherein each of the first and second bobbin portions comprises a semi-cylindrical recess, the semi-cylindrical recess of each of the first and second bobbin portions comprising two pole face windows, each pole face window representing an interior termination of each of the slots through the respective bobbin portion, and each of the pole faces is located at a pole face window so as to form part of a wall of the semi-cylindrical recess.

8. The four-pole stator assembly of claim 1, wherein each of the two hollow bobbin arms comprises an outer flange.

9. The four-pole stator assembly of claim 1, wherein the bobbin assembly comprises one or more fixing recesses.

10. The four-pole stator assembly of claim 9, wherein each of the first and second bobbin portions of the bobbin assembly comprises a fixing recess.

11. An electric motor comprising a rotor assembly, a frame, and a stator assembly, the four-pole stator assembly comprising:

a bobbin assembly; and two c-shaped stator cores, each of the two c-shaped stator cores comprising a back and first and second pole arms extending from the back;

wherein the bobbin assembly comprises first and second bobbin portions, each of the bobbin portions comprising two hollow bobbin arms, each of the two hollow bobbin arms defining a slot for receiving a pole arm, and a winding wound around each hollow bobbin arm, and wherein the two c-shaped stator cores are arranged such that each of the two c-shaped stator cores bridges across both the first and second bobbin portions with one of the first and second pole arms extending through a slot in the first bobbin portion, and the other of the first and second pole arms extending through a slot in the second bobbin portion, the pole arms being fixed in the slots by adhesive.

12. The electric motor of claim 11, wherein the rotor assembly comprises a permanent magnet fixed to a rotatable shaft, and the rotor assembly is positioned such that the permanent magnet is located between the two c-shaped stator cores.

13. The electric motor of claim 12, wherein the permanent magnet is a four pole magnet.

14. The electric motor of any claim 11, wherein the bobbin assembly is fixed to the frame, the frame comprising one or more lugs that fit into one or more fixing recesses in the bobbin assembly.

15. The electric motor of claim 14, wherein the one or more lugs are fixed in the one or more fixing recesses by adhesive.

16. The electric motor of claim 11, wherein each of the first and second bobbin portions comprises a semi-cylindrical recess.

17. The electric motor of claim 16, wherein the semi-cylindrical recess comprises two pole face windows, each of the two pole face windows representing an interior termination of each of the slots through the respective bobbin portion.

18. The electric motor of claim 16, wherein the semi-cylindrical recess in each of the first and second bobbin portions forms part of a cylindrical bore through the bobbin assembly.

19. The electric motor of claim 11, wherein each pole arm of each of the two c-shaped stator cores comprises a pole face at an opposite end of the pole arm to the back.

20. The electric motor of claim 19, wherein each pole arm comprises a groove for containing adhesive positioned proximate to the pole face.

21. The electric motor of claim 19, wherein each of the first and second bobbin portions comprises a semi-cylindrical recess, the semi-cylindrical recess of each of the first and second bobbin portions comprising two pole face windows, each of the two pole face windows representing an interior termination of each of the slots through the respective bobbin portion, and each pole face is located at a pole face window so as to form part of a wall of the semi-cylindrical recess.

* * * * *